US012688286B2

(12) United States Patent
Gronát

(10) Patent No.: US 12,688,286 B2
(45) Date of Patent: Jul. 21, 2026

(54) NEURAL NETWORK DETECTION OF MALICIOUS ACTIVITY

(71) Applicant: Avast Software s.r.o., Prague (CZ)

(72) Inventor: Petr Gronát, Prague (CZ)

(73) Assignee: Gen Digital Inc., Tempe, AZ (US)

( * ) Notice: Subject to any disclaimer, the term of this patent is extended or adjusted under 35 U.S.C. 154(b) by 867 days.

(21) Appl. No.: 16/389,710

(22) Filed: Apr. 19, 2019

(65) Prior Publication Data

US 2019/0325134 A1    Oct. 24, 2019

Related U.S. Application Data

(60) Provisional application No. 62/660,833, filed on Apr. 20, 2018.

(51) Int. Cl.
*G06F 21/56*        (2013.01)
*G06N 3/0442*       (2023.01)
*G06N 3/08*         (2023.01)

(52) U.S. Cl.
CPC ........... *G06F 21/56* (2013.01); *G06N 3/0442* (2023.01); *G06N 3/08* (2013.01); *G06F 2221/034* (2013.01)

(58) Field of Classification Search
CPC ..... G06F 21/56; G06F 2221/034; G06N 3/08; G06N 3/0445; G06N 3/084; G06N 20/10
USPC ......................................................... 726/23
See application file for complete search history.

(56) References Cited

U.S. PATENT DOCUMENTS 8,989,954 B1 * 3/2015 Addepalli ............... G06F 3/017
                                                      701/32.7
10,322,728 B1 * 6/2019 Porikli ................. G06K 9/6274

10,389,744 B2 * 8/2019 Hartkopp ............ H04L 63/1408
10,601,852 B2 * 3/2020 Takahashi ............. H04L 41/142
10,699,195 B2 * 6/2020 Lehman ............... G06N 3/0445
10,748,066 B2 * 8/2020 Ravi ...................... G06F 17/16
11,106,975 B2 * 8/2021 Lei .......................... G06N 3/063
11,128,647 B2 * 9/2021 Smith ................... H04L 63/145
2017/0060844 A1 * 3/2017 He ...................... G06F 16/3331
2017/0140265 A1 * 5/2017 Le ............................ G06N 3/08
2018/0053108 A1 * 2/2018 Olabiyi ................. G06N 7/005

(Continued)

FOREIGN PATENT DOCUMENTS

EP            3362950 B1 * 7/2021 ........... G06N 3/0445

OTHER PUBLICATIONS

OnQ Blog, Snapdragon Smart Protect detects more mobile malware, Aug. 31, 2015, 7 pages, https://www.qualcomm.com/news/onq/2015/08/31/snapdragon-820-countdown-snapdragon-smart-protect-detects-more-mobile-malware. Accessed Feb. 19, 2019.

(Continued)

*Primary Examiner* — Dereena T Cattungal
(74) *Attorney, Agent, or Firm* — AVEK IP, LLC; Mark C. Young

(57)                ABSTRACT

A method of identifying malicious activity in a sequence of computer instructions includes providing the sequence of computer instructions into a recurrent neural network configured to provide an output based on both the current instruction being input and at least one prior instruction in the sequence, and evaluating the provided sequence of computer instructions in the recurrent neural network at multiple points within the sequence. An output is provided indicating whether the network has determined the code sequence to that point is likely malicious.

20 Claims, 8 Drawing Sheets

(56) References Cited

U.S. PATENT DOCUMENTS

| | | | |
|---|---|---|---|
| 2018/0075349 A1* | 3/2018 | Zhao | G06N 3/044 |
| 2018/0268015 A1* | 9/2018 | Sugaberry | G06Q 10/067 |
| 2018/0285740 A1* | 10/2018 | Smyth | G06N 3/048 |
| 2019/0122101 A1* | 4/2019 | Lei | G06N 3/044 |
| 2019/0122258 A1* | 4/2019 | Bramberger | G06Q 30/0248 |
| 2019/0205530 A1* | 7/2019 | Brown | G06F 21/566 |
| 2019/0205746 A1* | 7/2019 | Nurvitadhi | G06N 3/04 |
| 2019/0228154 A1* | 7/2019 | Agrawal | G06N 3/047 |
| 2019/0273510 A1* | 9/2019 | Elkind | G06N 20/00 |
| 2019/0281476 A1* | 9/2019 | Lyon | H04W 24/08 |
| 2019/0303567 A1* | 10/2019 | Batmaz | G06N 3/0454 |
| 2019/0311119 A1* | 10/2019 | Wang | G06N 3/08 |
| 2019/0312898 A1* | 10/2019 | Verma | H04L 63/1416 |
| 2019/0385057 A1* | 12/2019 | Litichever | H04L 63/14 |
| 2020/0004961 A1* | 1/2020 | Prokudin | G06N 3/084 |
| 2020/0066062 A1* | 2/2020 | Weber | G07C 5/008 |
| 2020/0167464 A1* | 5/2020 | Griffin | H04L 63/14 |
| 2021/0201078 A1* | 7/2021 | Yao | G06N 3/082 |
| 2021/0256350 A1* | 8/2021 | Zhao | G06F 21/563 |
| 2021/0326438 A1* | 10/2021 | Dichiu | G06F 21/552 |
| 2022/0269949 A1* | 8/2022 | Scheideler | G06N 3/0475 |
| 2023/0161879 A1* | 5/2023 | Koo | G06F 21/554 |
| | | | 726/23 |
| 2024/0039931 A1* | 2/2024 | Kim | H04L 63/1425 |

OTHER PUBLICATIONS

Qualcomm(R) Snapdragon(TM) Smart Protect, 2015, 1 page, Qualcomm Technologies, Inc.

* cited by examiner

NEURAL NETWORK DETECTION OF MALICIOUS ACTIVITY

CROSS-REFERENCE TO RELATED APPLICATIONS

This Application claims priority to U.S. Provisional Patent Application Ser. No. 62/660,833, filed on Apr. 20, 2018, entitled "NEURAL NETWORK DETECTION OF MALICIOUS ACTIVITY," currently pending, the entire disclosure of which is incorporated herein by reference.

FIELD

The invention relates generally to detection of malicious activity in computer systems, and more specifically to a neural network architecture for identifying malicious activity within a software sequence.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, a smartphone Core Level Security application may evaluate various applications as they execute on a user's smartphone to attempt to block execution of malicious applications. But, new threats are constantly emerging, making efficient and timely detection of vulnerabilities within a computer device such as a smartphone a significant challenge.

It is therefore desirable to manage analysis of executing code on a computerized system such as a smartphone or personal computer to provide efficient detection of vulnerabilities.

SUMMARY

One example embodiment of the invention comprises a method of identifying malicious activity in a sequence of computer instructions, including providing the sequence of computer instructions into a recurrent neural network configured to provide an output based on both the current instruction being input and at least one prior instruction in the sequence, and evaluating the provided sequence of computer instructions in the recurrent neural network at multiple points within the sequence. An output is provided indicating whether the network has determined the code sequence to that point is likely malicious.

In a further example, the output is a variable indicating a determined likelihood of the code sequence to that point being malicious. In another example, the point in the sequence of computer instructions where the output indicates the code sequence is malicious indicates the portion of the sequence likely to be malicious.

In a further example, installation of the code sequence is blocked once the output indicates the code sequence is likely malicious, or execution of the code sequence is blocked once the output indicates the code sequence is likely malicious.

The details of one or more examples of the invention are set forth in the accompanying drawings and the description below. Other features and advantages will be apparent from the description and drawings, and from the claims.

3

Figure 10:
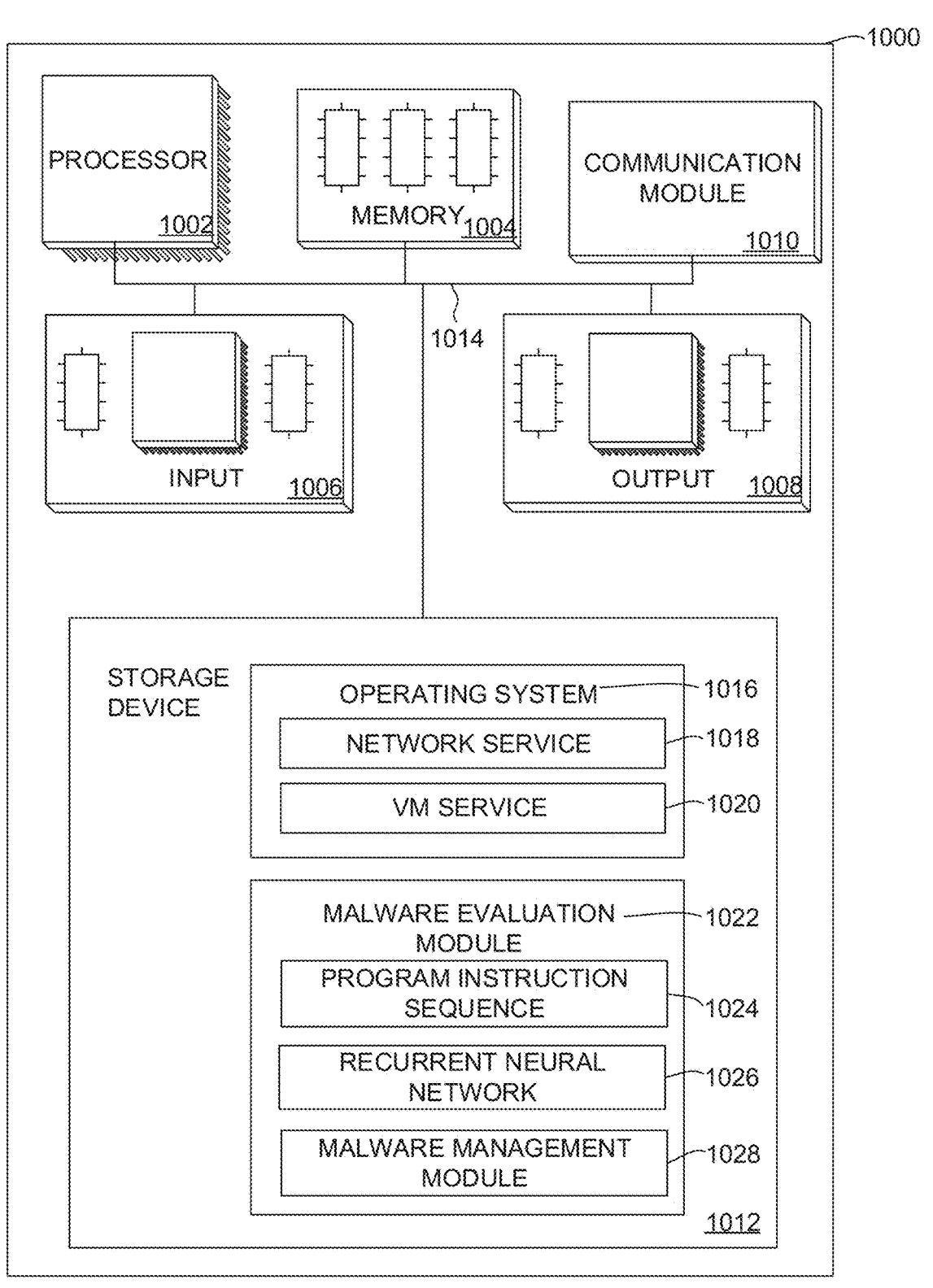

FIG. 10 is a computerized malware evaluation system comprising a recurrent neural network module, consistent with an example embodiment of the invention.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smartphones become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Smartphone apps, Microsoft® Word documents containing macros, Java applets, and other such common documents are all frequently infected with malware of various types, and users rely on tools such as antivirus software or other malware protection tools to protect their computerized devices from harm.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes.

Some smartphones, such as Apple® devices, lack the firewalls and the variety of antivirus software available for desktop computers, and rely more strongly on application store screening of new applications to prevent malware. Other mobile devices such as Android devices allow installable antivirus software, such as Avast's Mobile Security or Core Level Security applications that evaluate various applications as they execute on a user's smartphone to attempt to block execution of malicious applications. Sophisticated versions can block additional malicious activity such as using a call blocker to block unwanted calls, use firewalls to block certain types of data connections, and locking applications such as mobile banking applications from executing until a password or Personal Identification Number (PIN) is entered. But, as new threats are constantly emerging, efficient and timely detection of vulnerabilities within a computer device such as a smartphone remain a significant challenge.

Some examples described herein therefore seek to improve the performance of antivirus and other malware software by incorporating a recurrent neural network configured to detect malicious activity in a sequence of program instructions. In one such example, a sequence of computer instructions is provided to a recurrent neural network configured to provide an output based on both the current instruction being input and at least one prior instruction in the sequence, and the provided sequence of computer instructions is evaluated in the recurrent neural network at multiple points within the sequence, such as at each sequential program instruction. The output indicates whether the network has determined the code sequence to that point is likely malicious, such as by outputting a variable indicating a determined likelihood of the code sequence to that point being malicious.

Figure 1:
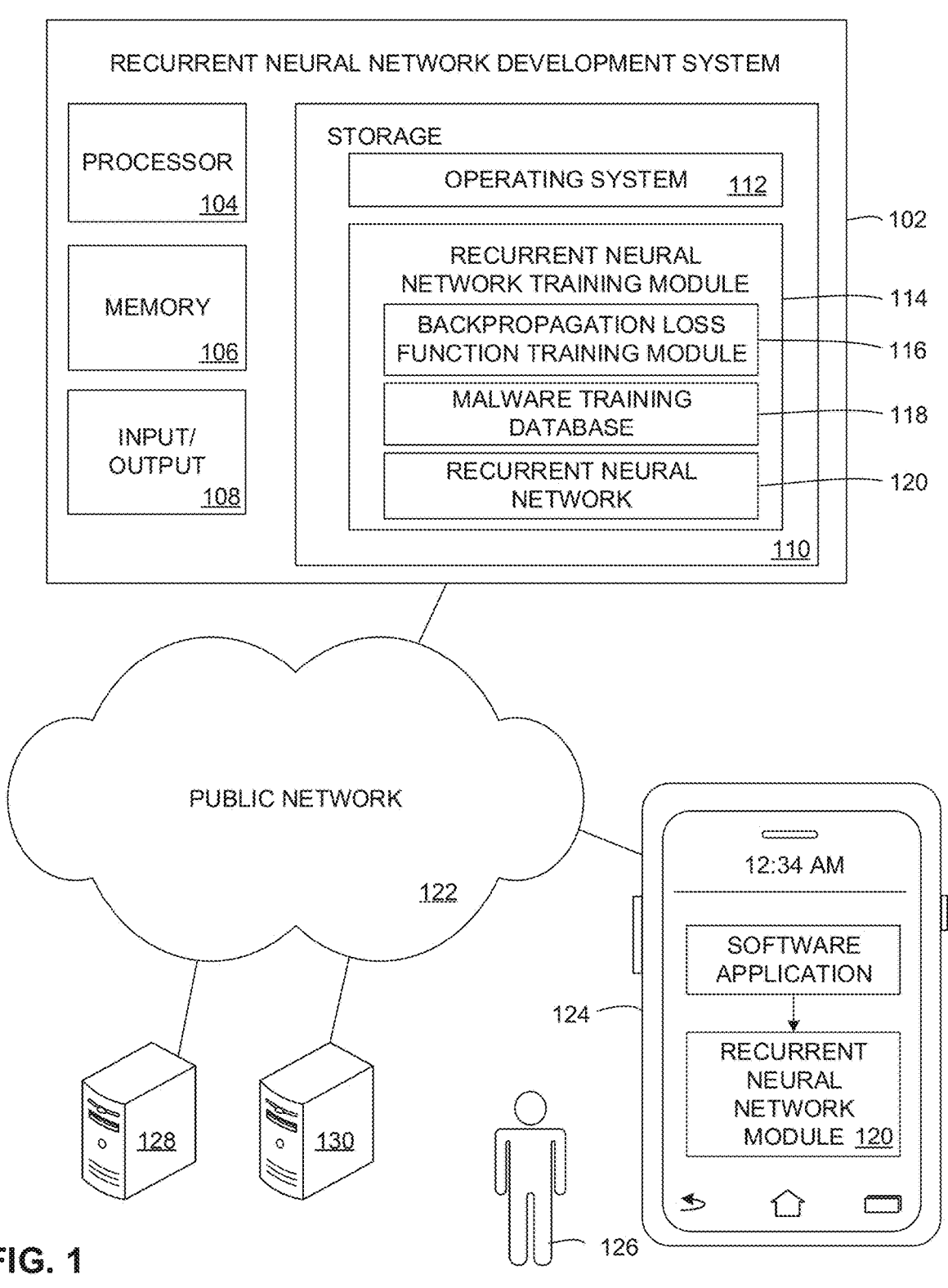
FIG. 1 shows a mobile computing device executing a recurrent neural network malware detection module in a networked environment, consistent with an example embodiment.

FIG. 1 shows a mobile computing device executing a recurrent neural network malware detection module in a networked environment, consistent with an example embodiment. Here, a recurrent neural network development system 102 comprises a processor 104, memory 106, input/output elements 108, and storage 110. Storage 110 includes an operating system 112, and a recurrent neural network training module 114 that is operable to train a recurrent neural network to detect malicious program instructions when installed in a user device such as smartphone 124. The recurrent neural network training module 114 further comprises backpropagation loss function training module 116 operable to train the recurrent neural network such as by providing an expected output for a given sequence of input and backpropagating the difference between the actual output and the expected output. The recurrent neural network trains itself by altering its configuration, such as multiplication coefficients used to produce an output from a given input to reduce or minimize the observed difference between the expected output and observed output. A malware training database 118 includes a variety of malicious code that can be used to train the recurrent neural network, and in a further example includes a variety of non-malicious code that can be used to help train the neural network to avoid false positives. The recurrent neural network being trained is shown at 120, and upon completion of initial training or completion of a training update is distributed such as via a public network 122 (such as the Internet, or a cellular network) to end user devices such as smartphone 124.

In operation, a user 126 installs the recurrent neural network 120 onto a computerized device such as smartphone 124, such as by downloading and installing it as an application or selecting to run it as a service as part of the smartphone's preconfigured software. Once installed and active, the recurrent neural network module 120 on smartphone 124 in this example is operable to scan new applications, such as those downloaded from an app store or developer server 128, and to scan other content such as Java applets that the user 126 may download such as from web server 130.

In a more detailed example, the recurrent neural network module 120 installed on smartphone 124 is operable to scan a newly-downloaded application before installation, immediately after installation, or as the newly-installed application is executed for the first time. If the recurrent neural network module 120 determines that the application is likely malicious, it notifies the user, stops execution of the application, uninstalls the application, blocks execution of the application, blocks installation of the application, or performs other such functions to restrict execution of the malicious instructions and/or notify the user in various examples, thereby protecting the user 126's smartphone 124 from malware. In a further example, the recurrent neural network module 120 is able to identify a point in the sequence of program instructions or sequence of other events such as Application Programming Interface (API) calls, kernel transactions, and the like from a running process that is malicious, and can in various examples identify that point in the sequence to the recurrent network development system 102 for investigation, stop execution of the sequence of events at that point, or otherwise use the identified point to protect the user's device or learn from the newly-detected malware.

The recurrent neural network 120 as developed at the recurrent neural network training module 114 and installed on the user's device 124 differs from traditional recurrent neural networks in that the output is not evaluated only at the conclusion of a sequence, such as evaluation of all the events from a software process or program instructions in a down-loaded application or completion of a program execution, but is evaluated at least multiple times through the sequence of events from the running process, and in a further example at each significant event meeting certain criteria in the sequence. This enables identification of the malicious activity at certain points of the sequence, which may be useful in stopping execution more quickly than with other methods, or which may be helpful in further evaluation of the identified program instruction sequence to determine whether and what kind of malicious activity may be present.

Figure 2:
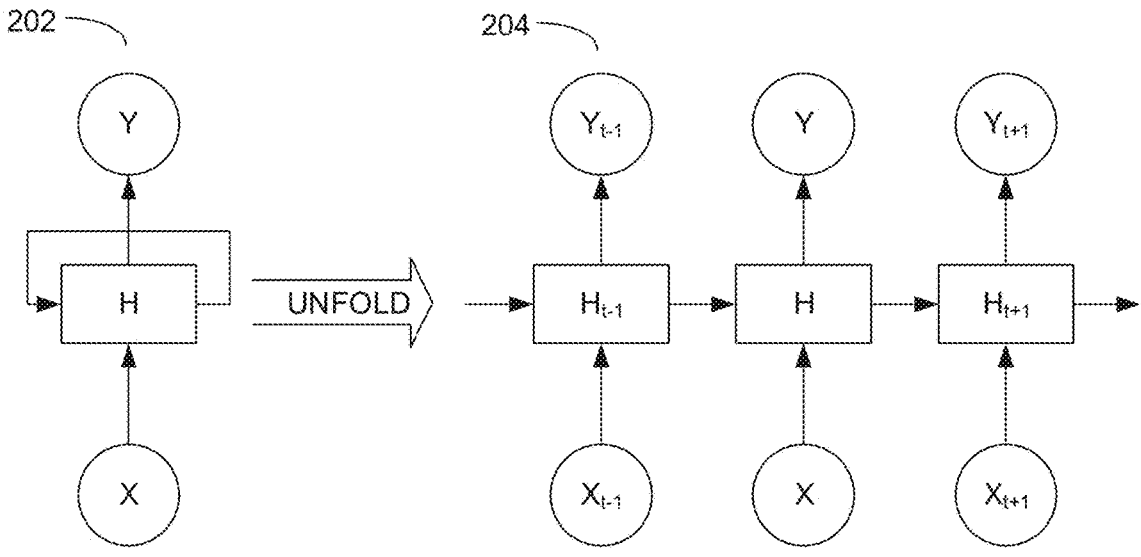
FIG. 2 shows a recurrent neural network, as may be used to practice some embodiments.

FIG. 2 shows a recurrent neural network, as may be used to practice some embodiments. Here, a recurrent neural network having sequential inputs X and generating sequential outputs Y is shown, where H is the recurrent neural network function that uses both prior state data and the input X to produce the output Y. There are many variations of input formats X, output formats Y, and network node formats and configurations H that will work to generate a useful result in different example embodiments. In the example of FIG. 2, the recurrent neural network is also shown unfolded over time at 204, reflecting how information from the neural network state at H used to produce output Y from input X is retained and used with the subsequent input $X_{t+1}$ to produce the subsequent output $Y_{t+1}$. The outputs Y over time are therefore dependent not only on the current inputs at each point in the sequence, but also on the state of the neural network up to that point in the sequence. This makes the neural network a recurrent neural network and makes it well-suited to evaluate input date where sequence and order is important, such as natural language processing (NLP). In a more detailed example, the recurrent neural network of FIG. 2 can be used to evaluate a natural language text for sentiment, outputting a result indicating positive, neutral, or negative sentiment as $Y_{end}$ corresponding to the last input word in the text $X_{end}$. Similarly, the recurrent neural network of FIG. 2 can be trained by providing the known sentiment of various text sequences as the desired output $Y_{end}$, with the difference between observed and expected outputs output $Y_{end}$ provided as an error signal via backpropagation to train the recurrent neural network to produce the desired end result.

Figure 3:
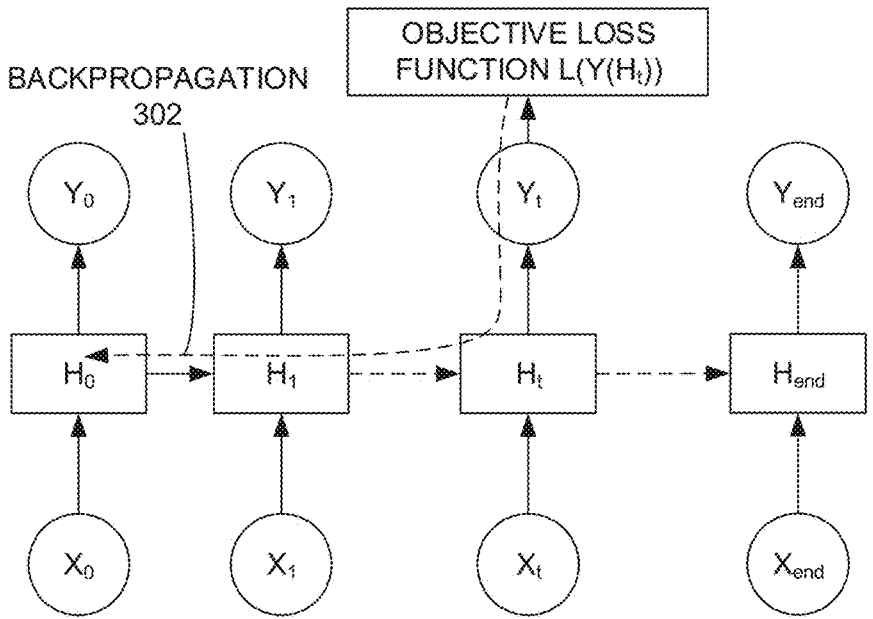
FIG. 3 shows a recurrent neural network configured to output and be trained at multiple points along the program instruction sequence of inputs, consistent with an example embodiment.
Figure 4:
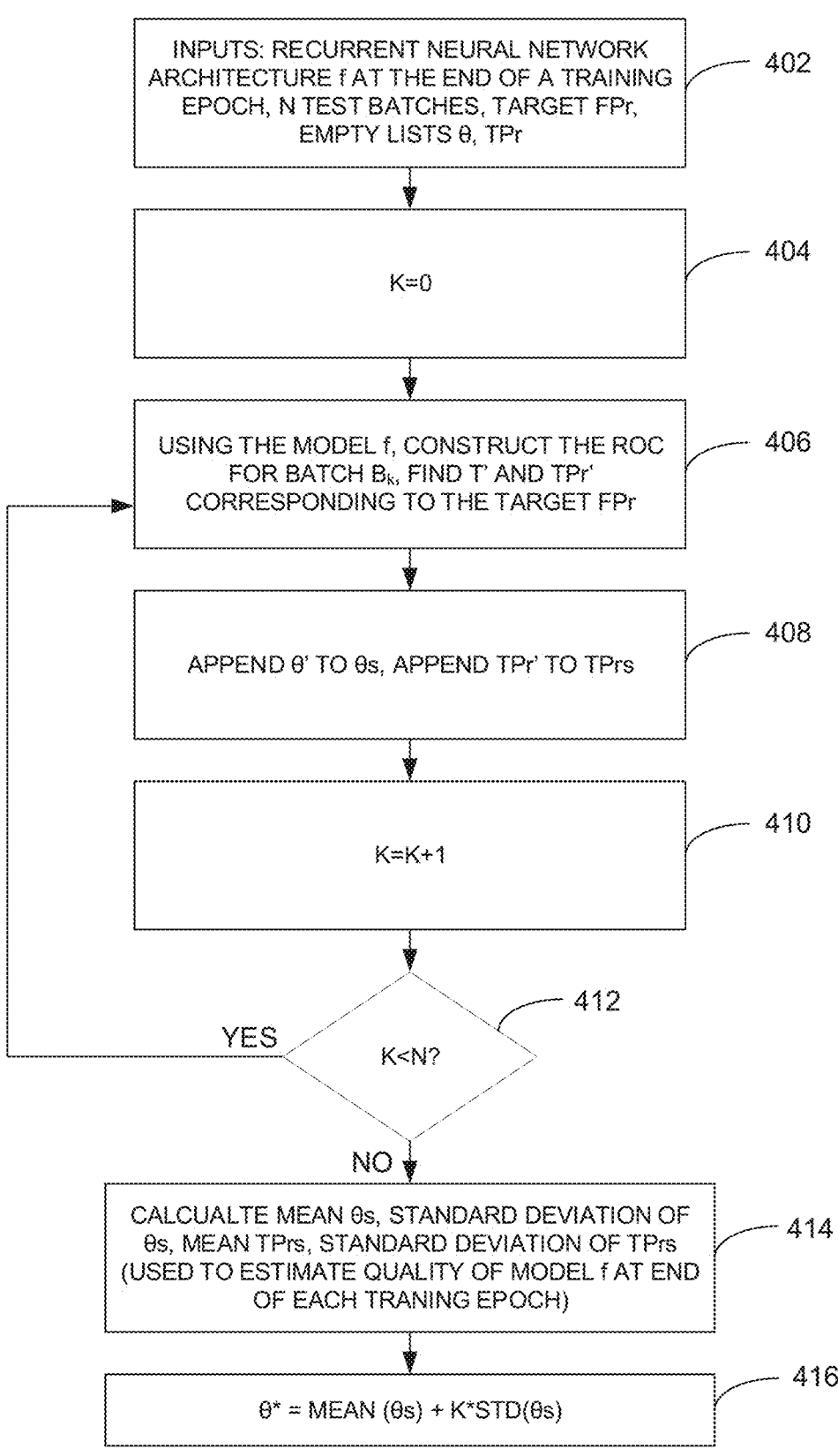
FIG. 4 is a flowchart showing a more detailed method for establishing the threshold $\theta$ used to determine at what level the output indicates that the program instruction sequence is malicious, consistent with an example embodiment.

But, this application of recurrent neural networks considers more than the final output value output $Y_{end}$, instead considering the output Y at multiple points or at each point in the program instruction sequence. FIG. 3 shows a recurrent neural network configured to output and be trained at multiple points along the program instruction sequence of inputs, consistent with an example embodiment. Here, the output at an arbitrary point t in the program instruction sequence (between $H_0$ and $H_{end}$) produces an output, which in training the recurrent neural network is compared to a desired output at that point in the program sequence. In a more detailed example, instructions known to be part of a malicious portion of code may have a desired output at a much higher level than other portions of the code sequence, while in other examples the element of the program instruction sequence that results in the maximum predictive output is trained to produce the desired output. Training in one example is achieved using a loss function that represents the error between the produced output and the desired or expected output, with the loss function output coupled or provided to the recurrent neural network nodes at $H_t$ and earlier via backpropagation as shown at 302. The backpropagated loss function signal is used within the neural network at $H_t$, $H_{t-1}$, $H_{t-2}$, etc. to train or modify coefficients of the recurrent neural network to produce the desired output, but with consideration of the training already achieved using previous training epochs or data sets. Many algorithms and methods for doing so are available, and will produce useful results here. The output of the neural network is compared against a threshold to determine whether the evaluated sequence is malicious, where the threshold θ is selected to provide an acceptable false positive rate FIG. 4 is a flowchart showing a more detailed method for establishing the threshold θ used to determine at what level the output indicates that the program instruction sequence is malicious, consistent with an example embodiment. Here, a target false positive rate FPr is selected, such as 1%, and various training data sequence sets or epochs are evaluated in the trained recurrent neural network to determine what actual false positive rate is observed at a given threshold θ'. Similarly, the true positive rate TPr is desirably as high as possible, and selection of the threshold θ will also consider detection of an acceptably high percentage of program instruction sequences that are actually malicious.

At 402, a trained recurrent neural network represented by function f and a target false positive rate FPr are selected for evaluation against various epochs or test batches N, and the threshold θ and corresponding true positive rates TPr are yet to be determined. At 404, the first test program instruction sequence set or test batch is processed, represented by K=0. At 406, the true positive rate TPr and false positive rates FPr are calculated for the batch $B_K$, and a Receiver Operating Characteristic (ROC) curve is constructed (see FIG. 9), which plots false positives FPr against true positives TPr for a various selected thresholds θ, showing graphically the performance of the trained recurrent neural network.

In this example, the threshold θ and corresponding true positive rate TPr are recorded for each test batch at 408, and the test batch is incremented at 410 and the process is repeated at 406 until the desired number of test batches is reached at 412. When the desired number of test batches have been processed and the resulting threshold θ and true positive rate TPr data have been recorded, the mean and standard deviation of the threshold θ and true positive detection rate TPr are calculated at 414 to estimate the quality of the trained recurrent neural network f, calculated as θ* as shown at 416. This process enables selection of a trained recurrent neural network function f that uses a determined threshold θ that reaches the target threshold for false positives FPr while making detection of true positives TPr as high as practical. Other methods of threshold detection and recurrent neural network function selection are available and in alternate examples can produce similarly desirable results.

Figure 5:
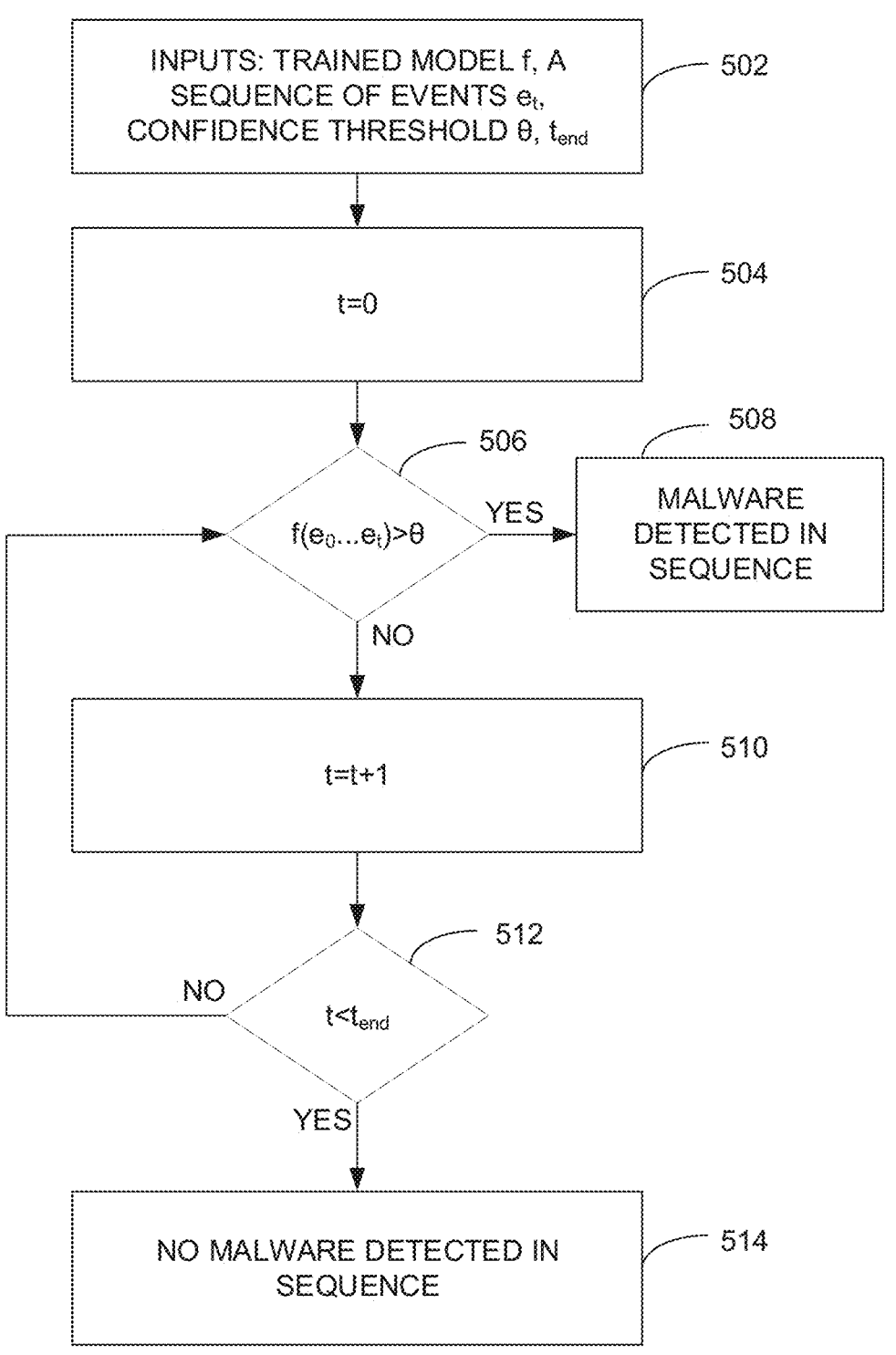
FIG. 5 is a flowchart illustrating a method of using a trained recurrent neural network to evaluate a sequence of events for malicious content, consistent with an example embodiment.

Once the recurrent neural network function is trained and the threshold θ is selected, evaluation of unknown (such as unknown clean software programs and so-called zero-day malware) can be performed, such as by exporting the trained recurrent neural network to an end user device such as smartphone 124 of FIG. 1. FIG. 5 is a flowchart illustrating a method of using a trained recurrent neural network to evaluate a sequence of program instructions or events from a running process for malicious content, consistent with an example embodiment. At 502, the trained recurrent neural network model f, a sequence of events $e_t$, a confidence threshold θ, and the number of events in the sequence $t_{end}$ are input or determined. The first event is selected corresponding to t=0 at 504, and the program instruction corresponding to t=0 is input into the trained recurrent neural network at 506 to produce an output.

When the output is less than the threshold θ, the sequence counter is incremented at 510 and when there are additional events in the sequence (before the end event $t_{end}$) as determined at 512, the next event is evaluated at 506. When the output is greater than the threshold θ, malware is detected in the sequence as indicated at 508, and additional action such as halting operation of the process, blocking execution of the process, blocking installation of the process, notification to the recurrent neural network provider, or additional actions may be taken.

Once the number of evaluated events reaches the number of events in the sequence at $t_{end}$ at 512, the evaluation process concludes with a determination that no malware was detected in the sequence, as reflected at 514. Such a determination may be used to permit installation of a new program, execution of downloaded code such as a Java applet served from a web page, or other such operation.

Figure 6:
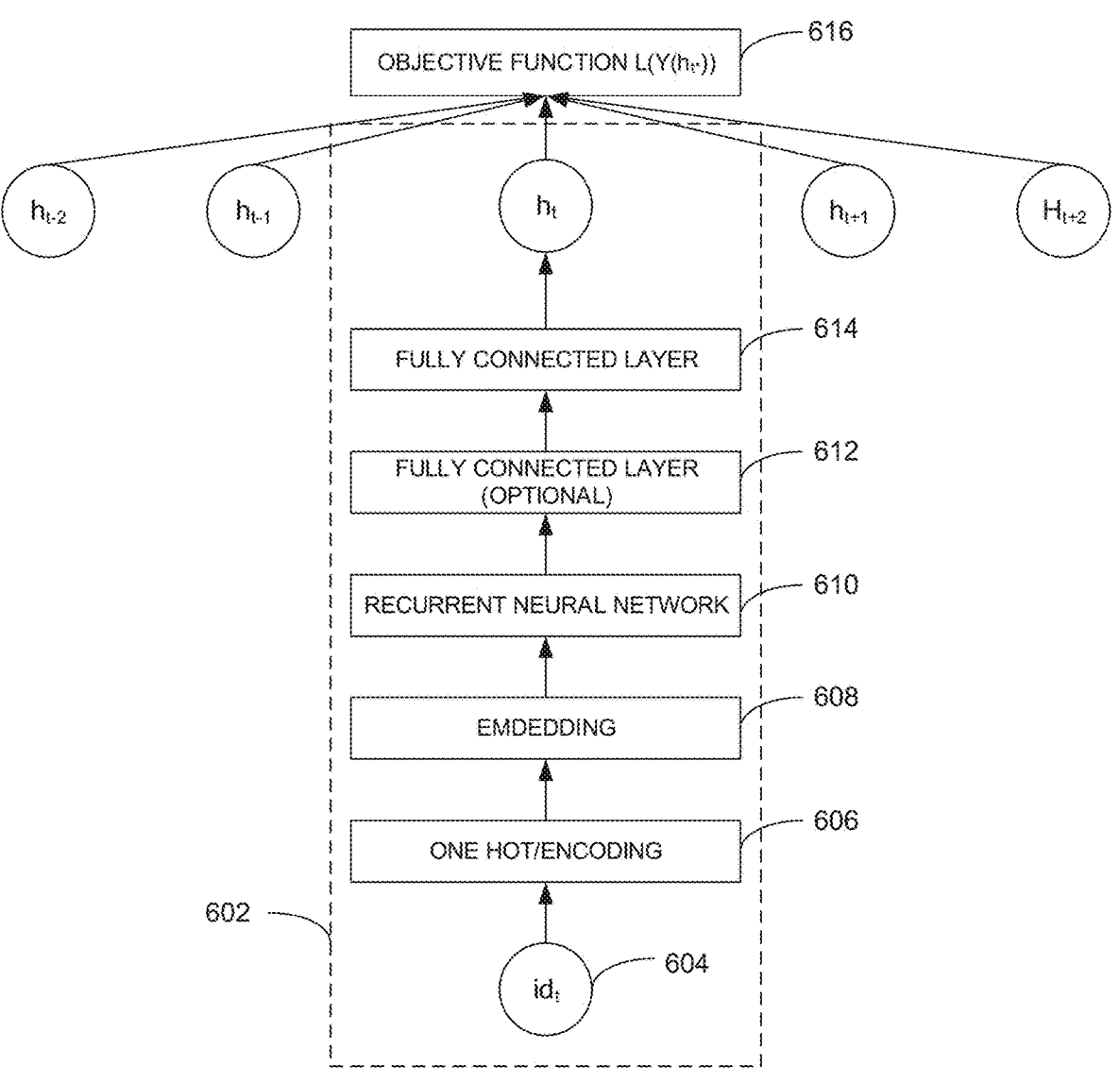
FIG. 6 shows a more detailed example of a recurrent neural network node, as may be used to practice some embodiments.

FIG. 6 shows a more detailed example of a recurrent neural network node, as may be used to practice some embodiments. Here, a recurrent neural network element such as 202 of FIG. 2 is shown in greater detail at 602. The node includes an event identification element 604 that is operable to recognize new events in the sequence, such as new events in a running process or program instructions in a sequence. Events are then encoded at 606 to be fed to the recurrent neural network, such as using a "one-hot" encoding in a word where one bit corresponds to each possible event of interest such that only one bit of the input word has a "one" value for each event in the event set. An embedding layer at 608 is operable to map the one-hot input word into a vector of latent factors such as by using an embedding matrix, which both reduces the size of the input word and enables recognition and mapping similar instructions to similar regions in the vector that is input to recurrent neural network 610. The recurrent neural network 610 can also accept as an input a previous output of a recurrent neural network, such as recurrent neural network 610 itself. In some embodiments, the recurrent neural network 610 includes a long short-term memory (LSTM) network and/or one or more gated recurrent units (GRU). An LSTM network enables the recurrent neural network 610 to preserve the error that can be backpropagated through time and layers and by maintaining a more constant error, the LSTM network enables recurrent neural network 610 to continue to learn over a large number (e.g., greater than 1000) time steps, thereby linking causes and effects. A GRU does not include an output gate, which writes the contents from its memory cell to the larger network at each time step.

The recurrent neural network 610 can have additional connected layers much like traditional neural networks, including in this example optional fully connected layer 612 and fully connected layer 614. The output of the fully connected layer 614 is then summed and provided as the output of the recurrent neural network element 602 to an objective function 616. In an embodiment, the objective function 616 is a mean squared error (MSE). Additionally or alternatively, the objective function 616 is a support vector machine (SVM) loss.

Figures 7, 8:
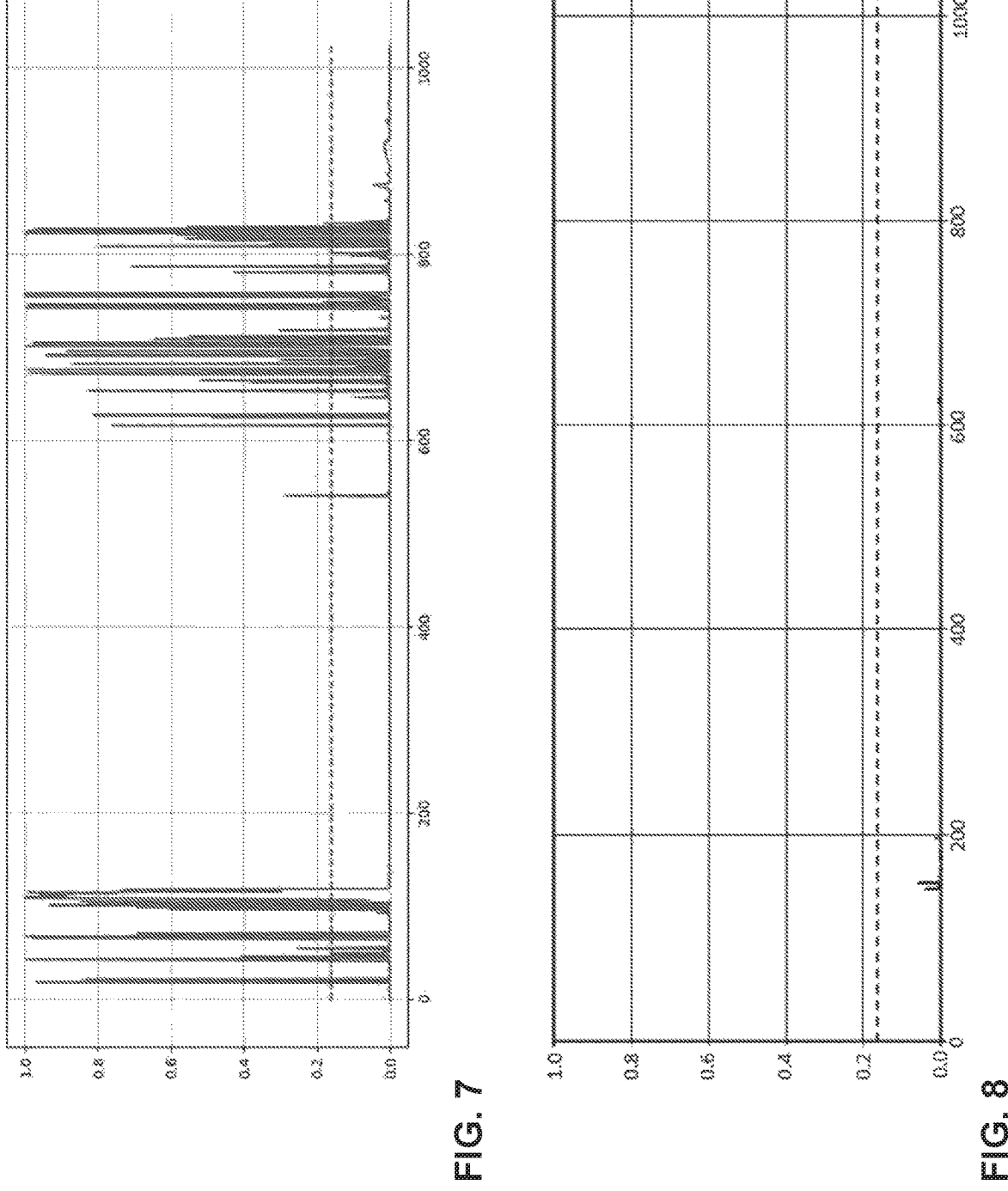
FIG. 7 is a threshold graph showing the value of the output relative to the threshold for a program instruction sequence containing malicious code, consistent with an example embodiment.
FIG. 8 is a threshold graph showing the value of the output relative to the threshold for a program instruction sequence not containing malicious code, consistent with an example embodiment.

FIG. 7 is a threshold graph showing the value of the output relative to the threshold for a program instruction sequence containing malicious code, consistent with an example embodiment. Here, the x-axis shows the numbered sequence of events or program instructions being evaluated, while the y-axis shows the output value of the trained recurrent neural network. The threshold value θ is shown on the y-axis at approximately 0.18, and it is evident that the output exceeds this threshold value at several points within the event sequence, indicating that the program likely contains malicious programming code.

FIG. 8 is a threshold graph showing the value of the output relative to the threshold for a program instruction sequence not containing malicious code, consistent with an example embodiment. Again, the x-axis shows the numbered sequence of events or program instructions being evaluated, while the y-axis shows the output value of the trained recurrent neural network. The threshold value θ is again shown on the y-axis at approximately 0.18, and the output rarely approaches a significant fraction of this threshold value within the program instruction sequence, indicating that the program likely does not contain malicious programming code.

Figure 9:
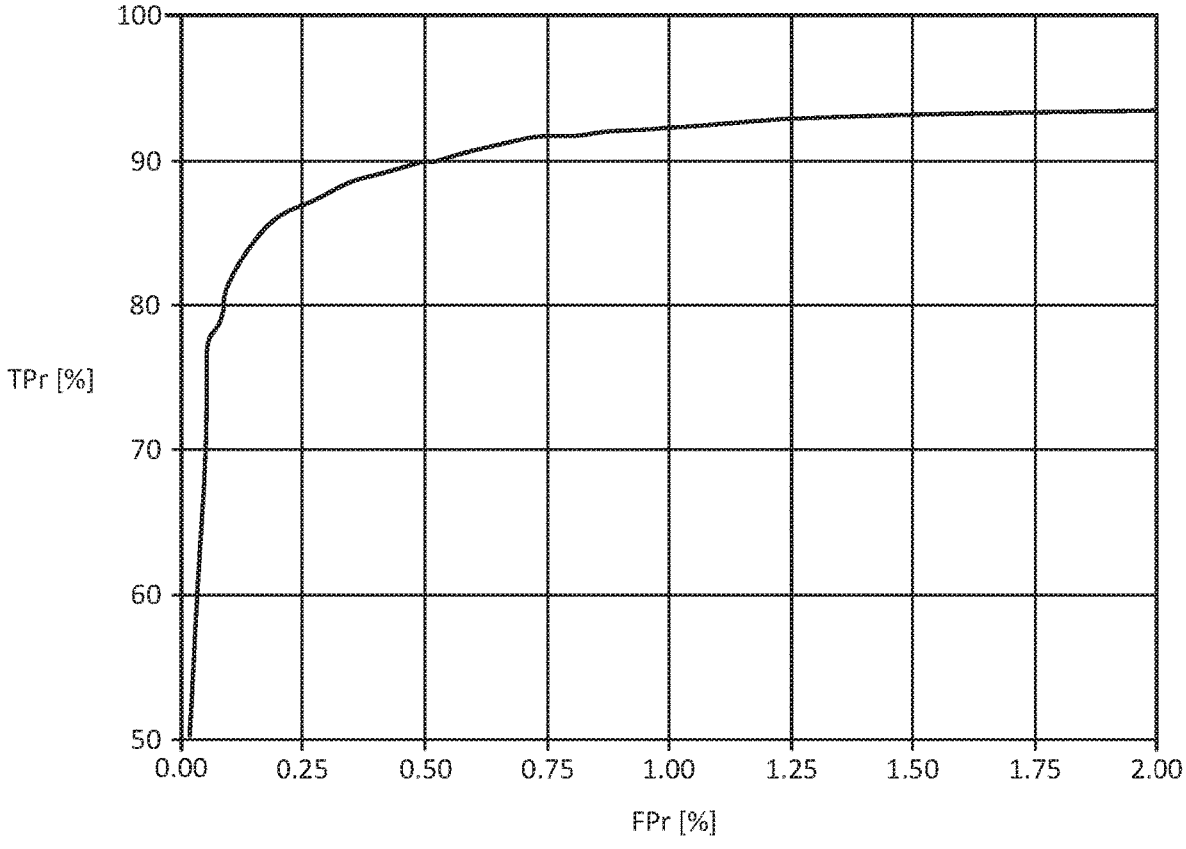
FIG. 9 is a Receiver Operating Characteristic (ROC) curve, illustrating the performance of the trained recurrent neural network in one example.

FIG. 9 is a Receiver Operating Characteristic (ROC) curve, illustrating the performance of the trained recurrent neural network in one example. The ROC curve is constructed by plotting false positives FPr against true positives TPr for a various selected thresholds θ, showing graphically the performance of the trained recurrent neural network. If the network were completely untrained and had no ability to discriminate malicious process events or program instructions from benign program code, the curve would be a relatively straight diagonal line extending up from left to right. The curve shown in FIG. 9 however has a relatively sharp rise, knee, and level portion, closely resembling the ideal square curve shape of an ideal recurrent neural network, suggesting graphically that the recurrent neural network represented by this Receiver Operating Characteristic curve is well-trained.

The computerized systems such as the recurrent neural network development system 102 of FIG. 1 used to train the recurrent neural network and the smartphone 124 that executes the recurrent neural network to protect against malicious programs or applications can take many forms, and are configured in various embodiments to perform the various functions described herein.

FIG. 10 is a computerized malware evaluation system comprising a recurrent neural network module, consistent with an example embodiment of the invention. FIG. 10 illustrates only one particular example of computing device 1000, and other computing devices 1000 may be used in other embodiments. Although computing device 1000 is shown as a standalone computing device, computing device 1000 may be any component or system that includes one or more processors or another suitable computing environment for executing software instructions in other examples, and need not include all of the elements shown here.

As shown in the specific example of FIG. 10, computing device 1000 includes one or more processors 1002, memory 1004, one or more input devices 1006, one or more output devices 1008, one or more communication modules 1010, and one or more storage devices 1012. Computing device 1000, in one example, further includes an operating system 1016 executable by computing device 1000. The operating system includes in various examples services such as a network service 1018 and a virtual machine service 1020 such as a virtual server. One or more applications, such as malware evaluation module 1022 are also stored on storage device 1012, and are executable by computing device 1000.

Each of components 1002, 1004, 1006, 1008, 1010, and 1012 may be interconnected (physically, communicatively, and/or operatively) for inter-component communications, such as via one or more communications channels 1014. In some examples, communication channels 1014 include a system bus, network connection, inter-processor communication network, or any other channel for communicating data. Applications such as malware evaluation module 1022 and operating system 1016 may also communicate information with one another as well as with other components in computing device 1000.

Processors 1002, in one example, are configured to implement functionality and/or process instructions for execution within computing device 1000. For example, processors 1002 may be capable of processing instructions stored in storage device 1012 or memory 1004. Examples of processors 1002 include any one or more of a microprocessor, a controller, a digital signal processor (DSP), an application specific integrated circuit (ASIC), a field-programmable gate array (FPGA), or similar discrete or integrated logic circuitry.

One or more storage devices 1012 may be configured to store information within computing device 1000 during operation. Storage device 1012, in some examples, is known as a computer-readable storage medium. In some examples, storage device 1012 comprises temporary memory, meaning that a primary purpose of storage device 1012 is not long-term storage. Storage device 1012 in some examples is a volatile memory, meaning that storage device 1012 does not maintain stored contents when computing device 1000 is turned off. In other examples, data is loaded from storage device 1012 into memory 1004 during operation. Examples of volatile memories include random access memories (RAM), dynamic random access memories (DRAM), static random access memories (SRAM), and other forms of volatile memories known in the art. In some examples, storage device 1012 is used to store program instructions for execution by processors 1002. Storage device 1012 and memory 1004, in various examples, are used by software or applications running on computing device 1000 such as malware evaluation module 1022 to temporarily store information during program execution.

Storage device 1012, in some examples, includes one or more computer-readable storage media that may be configured to store larger amounts of information than volatile memory. Storage device 1012 may further be configured for long-term storage of information. In some examples, storage devices 1012 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication modules 1010. Computing device 1000 in one example uses communication module 1010 to communicate with external devices via one or more networks, such as one or more wireless networks. Communication module 1010 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 1000 uses communication module 1010 to wirelessly communicate with an external device such as via public network 122 of FIG. 1.

Computing device 1000 also includes in one example one or more input devices 1006. Input device 1006, in some examples, is configured to receive input from a user through tactile, audio, or video input. Examples of input device 1006 include a touchscreen display, a mouse, a keyboard, a voice responsive system, video camera, microphone or any other type of device for detecting input from a user.

One or more output devices 1008 may also be included in computing device 1000. Output device 1008, in some examples, is configured to provide output to a user using tactile, audio, or video stimuli. Output device 1008, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD), or any other type of device that can generate output to a user.

Computing device 1000 may include operating system 1016. Operating system 1016, in some examples, controls the operation of components of computing device 1000, and provides an interface from various applications such as malware evaluation module 1022 to components of computing device 1000. For example, operating system 1016, in one example, facilitates the communication of various applications such as malware evaluation module 1022 with processors 1002, communication unit 1010, storage device 1012, input device 1006, and output device 1008. Applications such as malware evaluation module 1022 may include program instructions and/or data that are executable by computing device 1000. As one example, malware evaluation module 1022 evaluates a program instruction 1024 using trained recurrent neural network 1026, and malware management module 1028 is operable to perform operations such as restricting installation or execution of applications or other program instruction sequences that are found likely to contain malware or malicious instructions. These and other program instructions or modules may include instructions that cause computing device 1000 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method of identifying malicious activity in a sequence of computer instructions, comprising:

providing a sequence of computer instructions into a neural network configured to provide an output based on both a current instruction in the sequence of computer instructions being evaluated and a prior state of the neural network, wherein the prior state of the neural network is based on at least one prior instruction in the sequence of computer instructions;

evaluating the sequence of computer instructions in the neural network at each sequential program instruction within the sequence;

wherein the neural network is trained using training sequences of computer instructions having expected outputs defined for multiple instruction positions within each training sequence, such that the neural network is trained to produce output values corresponding to individual instructions within a sequence rather than only a terminal output for the sequence as a whole; and at each sequential program instruction within the sequence, determining within the neural network whether the sequence of computer instructions to that point is malicious based on an output produced for the current instruction and representing a maximum predictive value among outputs produced for multiple instructions within the sequence to that point, and, upon determining that the sequence of computer instructions to that point is malicious, halting further evaluation of any remaining instructions based on the instruction-level output determination within the neural network itself, such that the termination is performed by the neural network's evaluation logic and providing an output indicating that the sequence of computer instructions to that point is malicious.

2. The method of identifying malicious activity in a sequence of computer instructions of claim 1, wherein the output is a variable indicating a determined likelihood of the sequence of computer instructions to that point being malicious.

3. The method of identifying malicious activity in a sequence of computer instructions of claim 1, wherein the point in the sequence of computer instructions where the output indicates the sequence of computer instructions is malicious indicates a portion of the sequence of computer instructions at the point is malicious.

4. The method of identifying malicious activity in a sequence of computer instructions of claim 1, further comprising at least one of:

blocking installation of the sequence of computer instructions once the output indicates the code sequence is malicious, or blocking execution of the sequence of computer instructions once the output indicates the sequence of computer instructions is malicious.

5. The method of identifying malicious activity in a sequence of computer instructions of claim 1, wherein the neural network comprises one of a long short-term memory (LSTM) neural network and a gated recurrent unit (GRU) neural network.

6. The method of identifying malicious activity in a sequence of computer instructions of claim 1, wherein the neural network evaluates the provided sequence of computer instructions for malicious activity on an end-user device.

7. The method of identifying malicious activity in a sequence of computer instructions of claim 6, wherein the neural network is trained to evaluate the provided sequence of computer instructions for malicious activity on a service provider device different from the end-user device.

8. The method of identifying malicious activity in a sequence of computer instructions of claim 1, wherein the neural network is trained to evaluate the provided sequence of computer instructions for malicious activity by using a loss function indicating an output error coupled to the neural network output at a point in the sequence of computer instructions producing the maximum output in the sequence.

9. The method of identifying malicious activity in a sequence of computer instructions of claim 1, wherein the neural network is trained to evaluate the provided sequence of computer instructions for malicious activity by establishing an output threshold for which a false positive rate is acceptable.

10. A method of creating a neural network operable to identify malicious activity in a sequence of computer instructions, comprising:

providing a training sequence of computer instructions and an expected output based on both a current instruction in the sequence of computer instructions being evaluated and a prior state of the neural network, wherein the prior state of the neural network is based on at least one prior instruction in the training sequence of computer instructions, the expected output indicating whether the training sequence of computer instructions to that point in the sequence are malicious, wherein the expected output comprises expected outputs defined for multiple instruction positions within the training sequence;

evaluating the sequence of computer instructions in the neural network at each sequential program instruction within the sequence;

at each sequential program instruction within the sequence, determining within the neural network whether the sequence of computer instructions to that point is malicious and, upon determining that the sequence of computer instructions to that point is malicious, halting further evaluation of any remaining instructions in the sequence of computer instructions within the neural network itself during the training sequence, such that the error signal is generated based on the instruction producing the maximum predictive value such that the termination is performed by the neural network's evaluation logic and providing an error signal to the neural network based on a difference between the expected output and an actual output of the neural network to that point in the sequence; and modifying the neural network to reduce the difference between the expected output and the actual output, thereby training the neural network to identify whether the training sequence of computer instructions is malicious, wherein modifying the neural network comprises training the neural network based on an instruction within the training sequence that produces a maximum predictive value relative to other instructions within the training sequence.

11. The method of creating a neural network operable to identify malicious activity in a sequence of computer instructions of claim 10, wherein modifying the neural network to reduce the difference between the expected output and the actual output comprises backpropagation of the difference between the expected output and the actual output.

12. The method of creating a neural network operable to identify malicious activity in a sequence of computer instructions of claim 10, wherein modifying the neural network to reduce the difference between the expected output and the actual output comprises training the output at the point in the sequence of computer instructions that results in an output having the maximum predictive level for the sequence.

13. The method of creating a neural network operable to identify malicious activity in a sequence of computer instructions of claim 10, wherein the neural network comprises one of a long short-term memory (LSTM) neural network and a gated recurrent unit (GRU) neural network.

14. The method of creating a neural network operable to identify malicious activity in a sequence of computer instructions of claim 10, further comprising configuring the neural network to evaluate the training sequence of computer instructions for malicious activity on an end-user device different from the computerized device on which the neural network is trained.

15. The method of creating a neural network operable to identify malicious activity in a sequence of computer instructions of claim 10, wherein the neural network is trained to evaluate the training sequence of computer instructions for malicious activity by establishing an output threshold for which a false positive rate is acceptable.

16. A computerized device configured to identify malicious activity in a sequence of computer instructions, comprising:

a computerized device having stored thereon a sequence of computer application instructions executed on the computerized device;

a neural network malware evaluation module executing on the computerized device, and operable to evaluate the sequence of computer application instructions and to provide an output based on both a current instruction in the sequence of computer instructions being evaluated and a prior state of the neural network, wherein the prior state of the neural network is based on at least one prior instruction in the sequence of computer application instructions, wherein the neural network malware evaluation module is trained using training sequences of computer instructions having expected outputs defined for multiple instruction positions within each training sequence, such that the neural network malware evaluation module is trained to produce output values corresponding to individual instructions within a sequence rather than only a terminal output for the sequence as a whole;

wherein the provided sequence of computer instructions is evaluated in the neural network malware evaluation module at each sequential program instruction within the sequence of computer application instructions, and at each sequential program instruction within the sequence, determining within the neural network whether the sequence of computer instructions to that point is malicious based on an output produced for a current instruction and representing a maximum predictive value within the sequence of computer application instructions to that point, and, upon determining that the sequence of computer instructions to that point is malicious, halting further evaluation of any remaining instructions in the sequence of computer instructions within the neural network itself, such that the termination is performed by the neural network's evaluation logic and outputting from the neural network malware evaluation module an indication that the sequence of computer application instructions to that point is malicious.

17. The computerized device configured to identify malicious activity in a sequence of computer instructions of claim 16, wherein the output is a variable indicating a determined likelihood of the sequence of computer application instructions to that point being malicious.

18. The computerized device configured to identify malicious activity in a sequence of computer instructions of claim 16, wherein the point in the sequence of computer application instructions where the output indicates the code sequence is malicious indicates the portion of the sequence that is malicious.

19. The computerized device configured to identify malicious activity in a sequence of computer instructions of claim 16, further comprising at least one of:

blocking installation of the sequence of computer application instructions once the output indicates the sequence of computer application instructions is malicious, or blocking execution of the sequence of computer application instructions once the output indicates the sequence of computer application instructions is malicious.

20. The computerized device configured to identify malicious activity in a sequence of computer instructions of claim 16, wherein the neural network is trained to evaluate the sequence of computer application instructions for malicious activity by using a loss function indicating an output error coupled to the neural network output at a point in the sequence of computer instructions producing the maximum output in the sequence.

\* \* \* \* \*